United States Patent [19]

Jacobus et al.

[11] 3,852,277

[45] Dec. 3, 1974

[54] 3-[(α-METHOXY-4-SUBSTITUTED CINNAMOYL)OXYMETHYL]-7-ACYLAMIDOCEPH-3-EM-4-CARBOXYLIC ACIDS

[75] Inventors: David P. Jacobus, Princeton; William J. Leanza, Berkley Heights; Burton G. Christensen, Scotch Plains, all of N.J.

[73] Assignee: Merck & Co., Inc., Rahway, N.J.

[22] Filed: Aug. 2, 1972

[21] Appl. No.: 277,444

[52] U.S. Cl....... 260/240 J, 260/243 C, 260/473 A, 260/521 R, 260/544 M, 260/600, 424/246
[51] Int. Cl............................................. C07d 99/24
[58] Field of Search ..................... 260/240 J, 243 C

[56] References Cited
UNITED STATES PATENTS

| | | | |
|---|---|---|---|
| 3,124,576 | 3/1964 | Stedman | 260/243 C |
| 3,129,224 | 4/1964 | Collins | 260/243 C |
| 3,338,897 | 8/1967 | Takano et al. | 260/243 C |
| 3,351,596 | 11/1967 | Chamberlin | 260/243 C |
| 3,351,597 | 11/1967 | Higgins | 260/243 C |
| 3,718,644 | 2/1973 | Weston et al. | 260/240 J |

OTHER PUBLICATIONS

C.A. 53:9131 a (1959) Groger et al.

*Primary Examiner*—Henry R. Jiles
*Assistant Examiner*—S. D. Winters
*Attorney, Agent, or Firm*—Walter Patton; Julian S. Levitt; J. Jerome Behan

[57] ABSTRACT

3-[(α-Methoxy-4-substituted cinnamoyl)oxymethyl]-7-acylamidoceph-3-em-4-carboxylic acid esters are prepared by treating the 3-[(α-methoxy-4-substituted cinnamoyl)oxymethyl]-7-aminoceph-3-em-4-carboxylic acid esters with an acylating agent. The compounds display an antibacterial action against gram-positive bacteria, for example, *Bacillus subtilis* and *Staphlococcus aureaus*, especially penicillin-resistant strains, and are also useful against gram-negative bateria, for example, *Escherichia coli* and *Salmonella schottmuelleri*.

10 Claims, No Drawings

3-[(α-METHOXY-4-SUBSTITUTED CINNAMOYL)OXYMETHYL]-7-ACYLAMIDOCEPH-3-EM-4-CARBOXYLIC ACIDS

The present invention provides new, pharmacologically active derivatives of cephalosporanic acid of the formula:

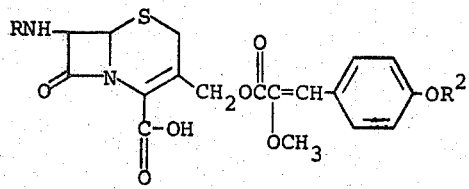

I wherein R is an acyl radical, for example, an aliphatic, aromatic, heterocyclic, araliphatic or heterocyclic aliphatic carboxylic acid radical; $R^2$ is hydrogen, sulfo or derivatives of sulfo thereof, for example, alkali metal salts derived from sodium, potassium and the like; $R^2$ is also phosphono, acetyl, pivaloyl, pivaloyloxymethyl or lower alkyl of from 1–3 carbon atoms such as methyl, ethyl or propyl and the non-toxic, pharmaceutically acceptable salts and esters thereof.

The acyl radical, R, having the general formula:

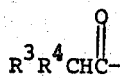

wherein $R^3$ and $R^4$ are as defined below, represent a preferred group of radicals because of the generally enhanced antibiotic activity of the $\Delta^3$-cephalosporins containing these acyl radicals. $R^3$ represents hydrogen, halo, amino, guanidino, phosphono, hydroxy, tetrazolyl, carboxy, sulfo or sulfamino. $R^4$ represents γ-amino-γ-carboxy lower alkyl, phenyl, substituted phenyl, a 5- or 6-membered monocyclic heterocycle containing one or more oxygen, sulfur or nitrogen hetero atoms in the ring such as furyl, thienyl, thiazolyl, isothiazolyl, oxadiazolyl, thiadiazolyl and the like, substituted heterocycles, phenylthio, heterocyclic or substituted heterocyclic thio groups or cyano. The substituents can be halo, carboxy-methyl, guanidino, guanidinomethyl, carboxamidomethyl, aminomethyl, nitro, methoxy or methyl. Especially preferred are those acyl radicals where $R^3$ is hydrogen, amino or carboxy and $R^4$ is 3-amino-3-carboxypropyl, phenyl or a 5- or 6-membered heterocyclic ring containing from 1 to 2 sulfur, oxygen or nitrogen atoms. Examples of these preferred radicals are D-5-amino-5-carboxyvaleryl, phenylacetyl, 3-bromophenylacetyl, p-aminomethylphenylacetyl, 4-carboxymethylphenylacetyl, 4-carboxamidomethylphenylacetyl, 2-furylacetyl, 5-nitrofurylacetyl, 3-furylacetyl, 5-chlorothienylacetyl, 5-methoxythienylacetyl, α-guanidino-2-thienylacetyl, 3-thienylacetyl, 4-methylthienylacetyl, 3-isothiazolylacetyl, 4-methoxyisothiazolylacetyl, 4-isothiazolylacetyl, 3-methylisothiazolylacetyl, 5-isothiazolylacetyl, 3-chloroisothiazolylacetyl, 3-methyl-1,2,5-oxadiazolylacetyl, 1,2,5-thiadiazolyl-4-acetyl, 3-methyl-1,2,5-thiadiazolyl-4-acetyl, 3-chloro-1,2,5-thiadiazolyl-4-acetyl, 3-methoxy-1,2,5-thiadiazolyl-4-acetyl, phenylthioacetyl, 4-pyridylthioacetyl, cyanoacetyl, tetrazolylacetyl, α-fluorophenylacetyl, D-phenylglycyl, 4-hydroxy-D-phenylglycyl, 2-thienylglycyl, 3-thienylglycyl, phenylmalonyl, 3-chlorophenylmalonyl, 2-thienylmalonyl, 3-thienylmalonyl, α-phosphonophenylacetyl, α-sulfaminophenylacetyl, α-hydroxyphenylacetyl, α-tetrazolylphenylacetyl and α-sulfophenylacetyl.

In carrying out the reactions described herein it is preferred to protect the 4-carboxy group and also other groups which may be in the nucleus such as other carboxy groups, amino groups or hydroxy groups. maximum yields are obtained by employing these protected compounds. Examples of these protecting groups are trichloroethyl, tert-butyl, benzoylmethyl, p-methoxybenzyl, benzyl, benzhydryl, trityl, trimethylsilyl, methoxymethyl, tert-butyloxycarbonyl and the like. These ester groups may be removed by methods well known to those skilled in the art, for example, the benzhydryl or p-nitrobenzyl groups may be removed by hydrogenation in the presence of a catalyst such as palladium-on-carbon or by treatment with a strong organic or inorganic acid. The tert-butyl or methoxymethyl groups may also be removed by treatment with strong organic or inorganic acid. Examples of these acids are hydrochloric acid, sulfuric acid, boron trifluoride etherate, formic acid, trifluoroacetic acid, trichloroacetic acid, nitrobenzoic acid and the like.

The 3-[(α-methoxy-4-substituted cinnamoyl)oxymethyl]-7-acylamidoceph-3-em-4-carboxylic acids (I, supra) have an activity similar to that of the presently known cephalosporins and are active against both gram-positive and gram-negative microorganisms.

When $R^2$ is hydrogen, there are various derivatives which can be prepared which also have antibiotic activity. These derivatives include a sulfo derivative and its salts. The sulfo derivative is prepared by treating the hydroxy derivatives with either pyridine-sulfur trioxide or chlorosulfonic acid. The salts are prepared by passing the sulfo compound through an ion exchange column on its sodium cycle to form a sodium sulfo derivative.

Other derivatives which may be prepared include various esters, for example, $R^2$ can be phosphono, acetyl, pivaloyl, pivaloyloxymethyl and the like or ethers, for example, lower alkyl ethers wherein $R^2$ is lower alkyl such as methyl, ethyl, propyl and the like.

The acetate and pivalate esters, for example, may be prepared by treating the hydroxy derivatives with acetic anhydride or pivalic anhydride, respectively. Treatment with dibenzyl phosphorochloridate followed by catalytic hydrogenolysis of the benzyl esters will give the phosphate ester. Treating the hydroxy derivative with pivaloyloxymethyl chloride in the presence of a base will yield the compound in which the 4-carboxylic acid as well as the phenolic hydroxy group is converted to the pivaloyloxymethyl derivative. The methyl ether is preferably prepared by treatment of the intermediate 3-hydroxymethyl-7-(protected amino)ceph-3-em-4-carboxylic acid ester with α-methoxy-4-methoxy-1-cinnamoyl halide and carrying out the subsequent reaction in the usual manner. The methyl ether will be stable to the conditions used for removal of the protecting groups.

The process for preparing the 3-[(α-methoxy-4-substituted cinnamoyl)oxymethyl]-7-acylamidoceph-3-em-4-carboxylic acid esters (I) comprises treating a correspondingly substituted 3-[(α-methoxy-4-substituted cinnamoyl)oxymethyl]-7-aminoceph-3-em-4-carboxylic acid ester (II, infra) with an acylating agent, for example, an acyl halide or acyl anhydride such as an aliphatic, aromatic, heterocyclic, araliphatic or heterocyclic aliphatic carboxylic acid halide or anhydride. Other acylating agents may also be employed, for example, a mixed acid anhydride with other carboxylic acids and particularly lower alkyl esters of carboxylic acid. Also, there may be employed carboxylic acids in the presence of a carbodiimide such as 1,3-dicyclohexyl carbodiimide. The reaction may be conducted at a temperature in the range of from about −20°C. to about 100°C. and, in general, the reaction is conducted at a temperature in the range of from about 0° to about 25°C. Any solvent in which the reactants are soluble and inert or substantially inert may be employed, for example, hydrocarbon solvents such as benzene, toluene and the like or tertiary amines, for example, trialkylamines and heterocyclic amines such as trimethylamine, pyridine and the like. The reaction is conducted for a period of time of from about five minutes to a maximum of three hours but, in general, a reaction time of about 0.5 to about 1 hour is sufficient. The following equation illustrates this process employing a carboxylic acid halide; however, it is to be understood that by substituting the corresponding carboxylic acid anhydride or other functionally equivalent acylating agents similar products may be obtained:

wherein $R^3$ and $R^4$ are as defined above and $R^2$ is hydrogen or a protecting group selected from trichloroethyl, tert-butyl, benzoylmethyl, p-methoxybenzyl, benzyl, benzhydryl, trityl, trimethylsilyl, methoxymethyl, tert-butyloxycarbonyl and the like; $R^1$ is an ester protecting group and X is halo, for example, chloro, bromo and the like.

The 3-[(α-methoxy-4-substituted cinnamoyl)oxymethyl]-7-aminoceph-3-em-4-carboxylic acid ester (II) employed above is prepared by treating a 3-[(α-methoxy-4-substituted cinnamoyl)oxymethyl]-7-(protected amino)ceph-3-em-4-carboxylic acid ester with a reducing agent, for example, zinc in the presence of acetic acid or with an acid catalyst, for example, a strong acid such as hydrochloric acid, trifluoroacetic acid and the like. The solvent employed depends upon the particular reducing agent selected, for example, when zinc is employed the solvent may also be ethylacetate or other lower alkyl esters. When an inorganic acid is employed, the lower alkanol solvents such as methanol, ethanol, propanol and the like are preferred. The reaction may be conducted at a temperature in the range of from about 0°C. to about 50°C.; however, in general, the reaction is conducted at 4° to about 25°C. The following equation illustrates this process:

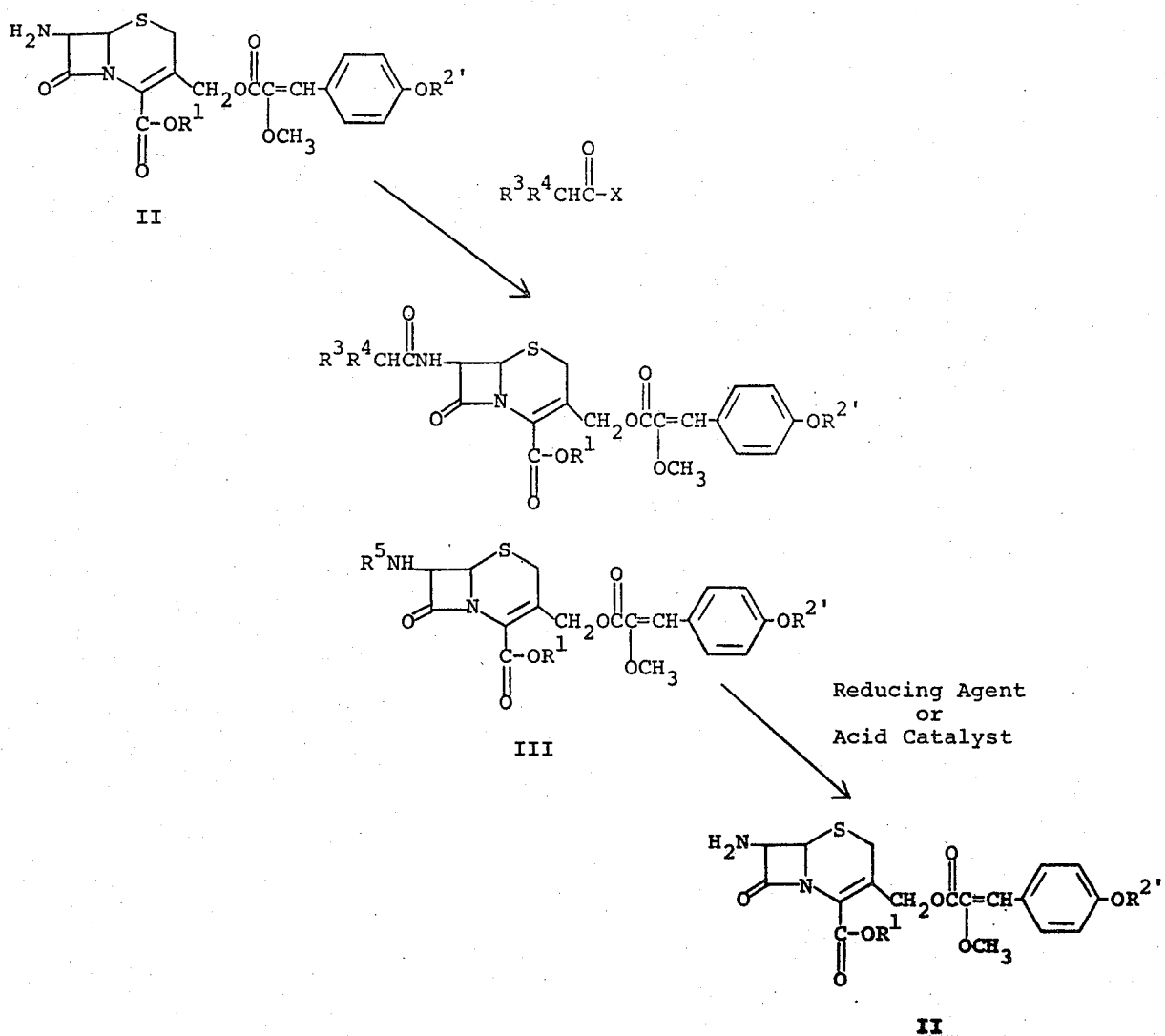

wherein $R^1$ and $R^2$ are as defined above and $R^5$ is an amino protecting group. Many groups suitable for protecting the amino group are already known in the penicillin and cephalosporin antibiotic literature. Examples of some of these groups are acyl groups such as tertiary butoxycarbonyl, trichloroethoxycarbonyl and the like or aryl lower alkyl groups such as triphenylmethyl and the like.

It should be noted that when the radical $R^2$ is other than hydrogen the reaction conditions may cleave the $R^2$ radical to afford those compounds wherein $R^2$ is hydrogen. If it is desired, a protecting group may then be reintroduced by standard methods. These protecting groups include trichloroethyl, tert-butyl, benzoylmethyl, p-methoxybenzyl, benzyl, benzhydryl, trityl, trimethylsilyl, methoxymethyl, tert-butyloxycarbonyl and the like.

The 3-[($\alpha$-methoxy-4-substituted cinnamoyl)oxymethyl]-7-(protected amino)ceph-3-em-4-carboxylic acid ester (III, supra) is prepared by treating a 3-hydroxymethyl-7-(protected amino)ceph-3-em-4-carboxylic acid ester with $\alpha$-methoxy-4-substituted oxycinnamoyl halide. This reaction may be conducted at a temperature in the range of from about 0° to about 50°C.; however, the reaction is preferably conducted at a temperature in the range of from about 4° to about 25°C. Any solvent which is inert or substantially inert to the reactants may be employed, for example, tetrahydrofuran, dimethylformamide, methylene chloride or dioxane. The reaction is preferably conducted in the presence of a base which will react with any hydrogen chloride formed during the course of the reaction. The following equation illustrates this reaction employing $\alpha$-methoxy-4-methoxymethoxycinnamoyl chloride; however, other substituents in the 4 position in place of the methoxymethyl group will afford similar results. Example of other groups include trichloroethyl, tert-butyl, benzoylmethyl, p-methoxybenzyl, benzyl, benzhydryl, trityl, trimethylsilyl, methoxymethyl, tert-butyloxycarbonyl and the like:

the like. The reaction may be conducted at a temperature in the range of from about 0° to about 50°C. However, in general, this reaction is conveniently conducted at room temperature.

The methyl $\alpha$-methoxy-4-substituted oxycinnamate is generally not isolated but is treated with an aqueous solution of a base, for example, an alkali metal or alkaline earth metal base such as sodium hydroxide, potassium hydroxide, calcium hydroxide and the like. This reaction is conveniently conducted at the reflux temperature of the particular solvent employed.

The salt of $\alpha$-methoxy-4-substituted oxycinnamic acid is then treated with oxalyl chloride to afford $\alpha$-methoxy-4-substituted oxycinnamoyl chloride. This reaction may be conducted at a temperature in the range of from about 0° to about 50°C.; however, in general, the reaction is conducted at a temperature in the range of from about 4° to about 25°C. Any solvent which is inert to the reactants may be employed such as benzene, toluene, tetrahydrofuran, methylene chloride and the like.

The 3-hydroxymethyl-7-(protected amino)ceph-3-em-4-carboxylic acid (IV) employed above is prepared by treating 7-aminocephalosporanic acid with a reagent of the formula, $R^5$-X, wherein $R^5$ and X are as defined above, to protect the 7-amino function followed by the removal of the 3-acetoxy group by treatment with a desacetylating compound such as acetylesterase to afford the correspondingly substituted 3-hydroxymethyl acid which is then treated with an esterifying agent.

Also included among this invention are the nontoxic, pharmaceutically acceptable salts, for example, the alkali and alkaline earth metal salts such as those derived from sodium, potassium, ammonium and calcium or salts with organic bases, for example, triethylamine, N-ethylpiperidine, dibenzylethylenediamine or propane.

The new compounds can be used as medicaments, for example, in the form of pharmaceutical prepara-

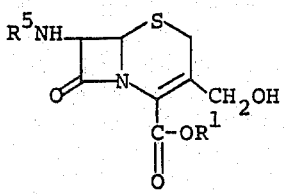

IV

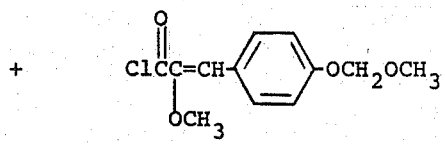

V

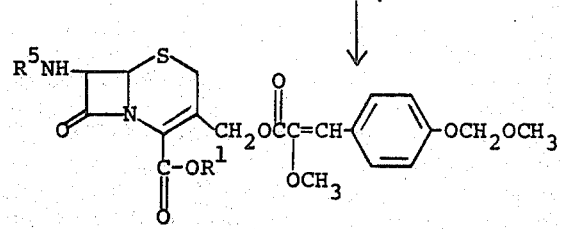

IIIa wherein $R^1$ and $R^5$ are as described above.

$\alpha$-Methoxy-4-substituted oxycinnamoyl chloride (V) is prepared by treating a 4-substituted oxybenzaldehyde with methylmethoxyacetate in the presence of sodium to form the compound methyl $\alpha$-methoxy-4-methoxymethoxycinnamate. Organic solvents suitable for carrying out this reaction are those that do not contain an active hydrogen, for example, toluene, diethyl ether, methylene chloride, benzene, chloroform and tions which contain them in admixture or conjunction with an organic or inorganic, solid or liquid pharmaceutical excipient suitable for enteral, parenteral or local administration. Suitable excipients are substances that do not react with the new compounds, for example, water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or contain assistants, such as preserving, stabilizing, wetting or emulsifying agents, solution promoters, salts for regulating the osmotic pressure or buffers.

The following examples illustrate a process for preparing the novel compounds of this invention. However, the examples are illustrative only and it will be apparent to those skilled in the art that other reagents similar to those described in the following examples may be employed to afford similar results.

EXAMPLE 1

Sodium 3-[(α-methoxy-4-sulfoxycinnamoyl)oxymethyl]7-β-(2-thienylacetamido)-ceph-3-em-4-carboxylate Step A: Sodium salt of α-methoxy-4-methoxymethoxycinnamic Acid A mixture of p-methoxymethoxybenzaldehyde (83 g.), methyl methoxyacetate (78 g.) and 2 cc. of ethanol is added to a suspension of 15 g. of sodium in 75 ml. of toluene and 75 ml. of ether under an atmosphere of nitrogen at such a rate as to maintain the temperature at 25°C. After the addition is complete the mixture is stirred for an additional 4 hours. 150 Ml. of ethanol is added, followed by 250 ml. of 5 percent aqueous sodium hydroxide and the mixture is refluxed for five hours. The organic solvents are evaporated and the residue taken up in 500 ml. of water and extracted with 500 ml. of benzene. The aqueous phase is acidified with 10 percent sulfuric acid and the α-methoxy-4-methoxymethoxycinnamic acid extracted into ether. The ether is evaporated and the residue dissolved in 10 percent sodium hydroxide to bring the pH to 7. The solution is concentrated and the sodium salt of α-methoxy-4-methoxymethoxycinnamic acid is precipitated by the addition of acetone, and recovered by filtration.

Step B: α-Methoxy-4-methoxymethoxycinnamoyl Chloride

A suspension of sodium α-methoxy-4-methoxymethoxycinnamic acid (2.6 g.) is stirred in 20 ml. of benzene and a solution of oxalylchloride (1.27 g.) in 5 ml. of benzene is added during 15 minutes. The precipitated sodium chloride is removed by filtration and the filtrate evaporated under reduced pressure to afford α-methoxy-4-methoxymethoxy cinnamoyl chloride.

Step C: 7-(2,2,2-Trichloroethoxycarbonylamino)-cephalosporanic Acid

A suspension of 4.8 g. of 7-aminocephalosporanic acid in 50 ml. of 0.1 N phosphate buffer is rapidly stirred with cooling at 0–5°C. as the pH is brought to 9 by the addition of a 20 percent sodium hydroxide solution. 2,2,2-Trichloroethoxycarbonyl chloride (6 g.) is added in one portion and sodium hydroxide solution added dropwise to maintain the pH at 8.8–9. When the reaction is complete the mixture is extracted with chloroform and the aqueous phase is acidified to pH 2 and extracted with 200 ml. of ethyl acetate. The organic phase is stirred with 100 ml. of water and the pH brought to 8 by the addition of sodium hydroxide solution. The aqueous phase is separated and freeze-dried to give the sodium salt of 7-(2,2,2-trichloroethoxycarbonylamino)-cephalosporanic acid.

Step D: Benzhydryl 7-β(2,2,2-trichloroethoxycarbonylamino)-3-hydroxymethylceph-3-em-4-carboxylate 2 Grams of sodium 7-(2,2,2-trichloroethoxycarbonylamino)cephalosporanate is dissolved in 50 ml. of citrus esterase solution and the mixture heated in a waterbath at 30°C. The pH is maintained at 6.6 to 8 hours by the addition of N-sodium hydroxide under the control of a pH stat. The solution is cooled at 0°–5°C., layered with 100 ml. of ethyl acetate and acidified to pH 2 with 10 percent hydrochloric acid. The ethyl acetate layer is separated, dried over anhydrous sodium sulfate, filtered, and added to 2 g. of diphenyldiazomethane. The solution is stirred for two hours at room temperature, then the ethyl acetate is evaporated under reduced pressure. The residue is chromatographed on 100 g. of silica gel. Elution with chloroform-ethyl acetate mixtures affords benzhydryl 7-(2,2,2-trichloroethoxycarbonylamino)-3-hydroxymethylceph-3-em-4-carboxylate.

Step E: Benzhydryl 3-[(α-methoxy-4-methoxymethoxycinnamoyl)oxymethyl]-7-β-(2,2,2-trichloroethoxycarbonylamino)ceph-3-em-4-carboxylate To a solution of 5 g. of benzhydryl-3-hydroxymethyl-7-β-(2,2,2-trichloroethoxycarbonylamino)ceph-3-em-4-carboxylate in 250 ml. of dry tetrahydrofuran, cooled to −20°C., is added 4 ml. of pyridine followed by a solution of 2 g. of α-methoxy-4-methoxymethoxycinnamoyl chloride in 15 ml. of tetrahydrofuran. The mixture is stirred for 20 minutes at −20°C. then filtered. The filtrate is evaporated under reduced pressure and the residue is taken up in 50 ml. of ethyl acetate and washed successively with water, 2 percent sodium bicarbonate solution and saturated sodium chloride solution. The ethyl acetate solution is dried over anhydrous sodium sulfate and evaporated. The residue is taken up in chloroform and chromatographed on 200 g. of silica gel. Elution with chloroform-ethyl acetate mixture affords benzhydryl 3-[(α-methoxy-4-methoxymethoxycinnamoyl)oxymethyl]-7-β-(2,2,2-trichloroethoxycarbonylamino)ceph-3-em-4-carboxylate.

Step F: Benzhydryl 7-β-amino-3-[(α-methoxy-4-methoxymethoxycinnamoyl)oxymethyl]ceph-3-em-4-carboxylate A solution of 1.5 g. of benzhydryl 3-[(α-methoxy-4-methoxymethoxycinnamoyl)oxymethyl-7-β-(2,2,2-trichloroethoxycarbonylamino)-ceph-3-em-4-carboxylate in 20 ml. of ethyl acetate is added to a vigorously stirred suppension of 7 g. of zinc dust in 10 ml. of ethyl acetate and 10 ml. of glacial acetic acid at such a rate as to maintain the temperature at 25°C. After the addition is complete the mixture is stirred for an additional hour and filtered. The cake is washed with 20 ml. of ethyl acetate and the combined filtrates washed with water and with 2.5 percent sodium bicarbonate solution, dried over anhydrous sodium sulfate and evaporated. The residue is chromatographed on 60 g. of silica gel and benzhydryl 7-β-amino-3-[(α-methoxy-4-methoxymethoxycinnamoyl)oxymethyl]ceph-3-em-4-carboxylate recovered by elution with mixtures of chloroform and methanol.

Step G: Benzhydryl 3-[(α-methoxy-4-methoxymethoxycinnamoyl)oxymethyl]-7-β-(2-thienylacetamido)ceph-3-em-4-carboxylate To a cooled solution of 1.2 g. of benzhydryl 7-β-amino-3-[(α-methoxy-4-methoxymethoxycinnamoyl)oxymethyl]ceph-3-em-4-carboxylate in 15 ml. of methylene chloride is added with stirring 0.8 ml. of 2-thienylacetyl chloride and 0.8 ml. of pyridine. The mixture is stirred for 15 minutes at 0°–5°C. and then poured over ice. The organic phase is separated and washed successively with 2 percent phosphoric acid, water and 2 percent sodium bicarbonate solution, then dried over anhydrous sodium sulfate and evaporated. The residue is chromatographed on 50 g. of silica gel. Elution with 5 percent ethyl acetate in methylene chloride affords benzhydryl 3-[(α-methoxy-4-methoxymethoxycinnamoyl)oxymethyl]-7-β-(2-thienylacetamido)ceph-3-em-4-carboxylate.

Step H: 3-[(α-Methoxy-4-hydroxycinnamoyl)oxymethyl]-7-β-(2-thienylacetamido)ceph-3-em-4-carboxylic Acid A mixture of 7.5 ml. of ethyl acetate, 2.5 ml. of methanol and 2 ml. of concentrated hydrochloric acid is cooled to 0°–2°C. and 0.5 g. of benzhydryl 3-[(α-methoxy-4-methoxymethoxycinnamoyl)oxymethyl]-7-β-(2-thienylacetamido)ceph-3-em-4-carboxylate is added. The mixture is stirred at 0°C. for 90 minutes and then added to a suspension of 2.5 g. of sodium bicarbonate in 25 ml. of water at 0°C. 10 Ml. of ethyl acetate is added and the organic layer containing neutral impurities is separated and discarded. The aqueous layer is cooled to 0°–5°C., overlayered with 20 ml. of ethyl acetate and with constant stirring the pH adjusted to 1.8 with cold 10 percent hydrochloric acid. The layers are separated and the ethyl acetate washed twice with cold water to remove residual hydrochloric acid, then dried over anhydrous sodium sulfate and filtered. The filtrate is evaporated under reduced pressure leaving 3-[(α-methoxy-4-hydroxycinnamoyl)oxymethyl]-7-β-(2-thienylacetamido)ceph-3-em-4-carboxylic acid.

Step I: Sodium 3-[(α-methoxy-4-sulfoxycinnamoyl)oxymethyl]-7-β-(2-thienylacetamido)ceph-3-em-4-carboxylate To a cooled solution of 0.53 g. of 3-[(α-methoxy-4-hydroxycinnamoyl)oxymethyl]-7-β-(7-thienylacetamido)ceph-3-em-4-carboxylic acid in 10 ml. of dimethylformamide containing 0.2 g. of pyridine is added 0.2 gram of pyridinesulfur trioxide in small portions with vigorous stirring. 100 Ml. of ether is added causing a gummy precipitate to form. The ether is decanted and the residue is dissolved in water and adsorbed on a 1 × 30 cm. column of neutral polystyrene resin. The column is washed with water to remove pyridine sulfate, then eluted with increasing concentrations of acetone to remove the pyridine salt of the product. The solution of product is passed through a column of 20 g. of sulfonated polystyrene resin on the sodium cycle and the eluant evaporated leaving the sodium 3-[(α-methoxy-4-sulfoxycinnamoyl)oxymethyl]-7-β-(2-thienylacetamido)ceph-3-em-4-carboxylate.

EXAMPLE 2

Disodium 7-β-(D-5-amino-5-carboxyvaleramido)-3-[(α-methoxy-4-sulfoxycinnamoyl)oxymethyl]ceph-3-em-4-carboxylate Step A: Benzhydryl 7-β-(tert-butoxycarbonylamino)-3-[(α-methoxy-4-methoxymethoxycinnamoyl)-oxymethyl]ceph-3-em-4-carboxylate To a solution of 4.5 g. of benzhydryl 3-hydroxymethyl-7-β-(tert-butoxycarbonylamino)ceph-3-em-4-carboxylate in 250 ml. of dry tetrahydrofuran, cooled to −20°C., is added 4 ml. of pyridine followed by a solution of 2 g. of α-methoxy-4-methoxymethoxycinnamoyl chloride in 15 ml. of tetrahydrofuran. The mixture is stirred for 20 minutes at −20°C. then filtered. The filtrate is evaporated under reduced pressure and the residue is taken up in 50 ml. of ethyl acetate and washed successively with water, 2 percent sodium bicarbonate solution and saturated sodium chloride solution. The ethyl acetate solution is dried over anhydrous sodium sulfate and evaporated. The residue is taken up in chloroform and chromatographed on 200 g. of silica gel. Elution with chloroform-ethyl acetate mixture affords benzhydryl 7-β-(tert-butoxycarbonylamino)-3-[(α-methoxy-4-methoxymethoxy-cinnamoyl)oxymethyl]ceph-3-em-4-carboxylate.

Step B: 7-β-Amino-3-[(α-methoxy-4-hydroxycinnamoyl)oxymethyl]ceph-3-em-4-carboxylic Acid A solution of 2 g. of benzhydryl 7-β-(tert-butoxycarbonylamino)-3-[(α-methoxy-4-methoxymethoxycinnamoyl)oxymethyl]ceph-3-em-4-carboxylate in 30 ml. of ethylacetate containing 8 ml. of concentrated hydrochloric acid and 10 ml. of methanol is stirred at 0°–2°C. for 1 hour. The solvents and hydrochloric acid are removed on a vacuum pump and the residue is taken up in aqueous sodium bicarbonate solution and ether. The ethereal layer is separated and the aqueous solution is acidified to pH 4 with hydrochloric acid causing the product to precipitate. The mixture is filtered and the cake is washed with cold water and air-dried to afford 7-β-amino-3-[(α-methoxy-4-hydroxycinnamoyl)oxymethyl]ceph-3-em-4-carboxylic acid.

Step C: 7-β-[D-5-Tert-butyloxycarbonylamino-5-carboxyvaleramido]-3-[(α-methoxy-4-hydroxycinnamoyl)oxymethyl]ceph-3-em-4-carboxylic Acid To a suspension of 385 mg. of 7-β-amino-3-[(α-methoxy-4-hydroxycinnamoyl)oxymethyl]ceph-3-em-4-carboxylic acid in 10 ml. of dry dimethylformamide cooled to 5°C. is added 0.2 ml. of pyridine followed by the addition of 0.25 g. of trimethylsilyl chloride. The mixture is stirred until the amine dissolves. To the resulting solution containing trimethylsilyl 7-β-amino-3-[(α-methoxy-4-trimethylsiloxycinnamoyl)oxymethyl]ceph-3-em-4-carboxylate is added 0.4 g. of D-5-tert-butyloxycarbonylamino-5-(2,2,2-trichloroethoxy)carbonylvaleryl chloride and 0.1 ml. of pyridine. The solution is stirred for 10 minutes at 5°C. and poured into 50 ml. of 0.1 N phosphoric acid. The mixture is extracted with 50 ml. of ethyl acetate and the ethyl acetate solution washed with 50 ml. saturated sodium chloride solution, dried over anhydrous sodium sulfate and concentrated to 10 ml. The concentrated ethyl acetate solution containing 7-β-[D-5-tert-butyloxycarbonylamino-5-(2,2,2-trichloroethoxy)carbonylvaleramido]-3-[(α-methoxy-4-hydroxycinnamoyl)oxymethyl]ceph-3-em-4-carboxylic acid is added dropwise to a vigorously stirred suspension of 2.5 g. of zinc dust and 3 ml. of acetic acid in 5 ml. of ethyl acetate. The mixture is stirred for 2 hours at 25°C. and filtered. The cake is washed with 10 ml. of ethyl acetate. The combined filtrate and washings are extracted with 25 ml. of 4 percent sodium bicarbonate solution. The aqueous extract is cooled and acidified to pH 2 and extracted with ethyl acetate. The ethyl acetate solution is washed with saturated sodium chloride solution, dried over sodium sulfate and evaporated under reduced pressure to afford 7-β-[D-5-tert-butyloxycarbonylamino-5-carboxyvaleramido]-3-[(α-methoxy-4- hydroxycinnamoyl)oxymethyl]ceph-3-em-4-carboxylic acid.

Step D: Sodium 7-β-(D-5-amino-5-carboxyvaleramido)-3-[(α-methoxy-4-hydroxycinnamoyl)oxymethyl]ceph-3-em-4-carboxylate To 0.2 g. of 7-β-[D-5-tert-butyloxycarbonylamino-5-carboxyvaleramido]-3-[(α-methoxy-4-hydroxycinnamoyl)oxymethyl]ceph-3-em-4-carboxylic acid is added 2 ml. of trifluoroacetic acid. The mixture is kept for 2 minutes at room temperature and the excess trifluoroacetic acid is evaporated on the vacuum pump. The residue is dissolved in 5 ml. of water and the pH adjusted to 4 with sodium bicarbonate solution. The solution is lyophilized giving sodium 7-β-(D-5-amino-5-carboxyvaleramido)-3-[(α-methoxy-4-hydroxycinnamoyl)oxymethyl]ceph-3-em-4-carboxylate.

Step E: Disodium 7-β-(D-5-amino-5-carboxyvaleramido)-3-[(α-methoxy-4-sulfoxycinnamoyl)-oxymethyl]ceph-3-em-4-carboxylate A mixture of carbon disulfide (8 ml.) and chlorosulfonic acid (0.34 ml.) is cooled to −5°C. and diethyl aniline (1.7 ml.) is added dropwise with stirring at 0°-5°C. The temperature of the mixture is allowed to rise to 15°-20°C. when a solution of 2.6 g. of 7-β-[D-5-tert-butoxycarbonyl-amino-5-carboxyvaleramido]-3-[(α-methoxy-4-hydroxycinnamoyl)-oxymethyl]ceph-3-em-4-carboxylic acid in 10 ml. of carbon disulfide is added in one portion. The mixture is stirred for one hour at room temperature, then added to cracked ice. The mixture is brought to pH 10 with sodium carbonate and extracted twice with 50 ml. of chloroform to remove diethyl aniline. The aqueous solution is brought to pH 7 and freeze-dried. The residue is treated with 10 ml. of trifluoroacetic acid at room temperature for 2 minutes and the excess removed under vacuum. The residue is dissolved in water and adsorbed on a 2 × 40 cm. column of Amberlite XAD-2 resin (cross-linked polystyrene beads) and the column eluted with water to remove inorganic salts. The produce is eluted with 5 percent aqueous acetone, which is evaporated under reduced pressure to afford disodium 7-β-(D-5-amino-5-carboxyvaleramido)-3-[(α-methoxy-4-sulfoxycinnamoyl)oxymethyl]ceph-3-em-4-carboxylate.

By following substantially the procedures described in Examples 1 and 2 and by substituting for the 2-thienylacetyl chloride and D-5-tert-butoxycarbonylamino-5-(2,2,2-trichloroethoxy)carbonylvaleryl chloride of Example 1, Step G, and Example 2, Step C, respectively, an equimolar quantity of other acylating agents, all of the products of this invention may be prepared. The following equation, taken together with Table I, illustrates the starting materials, intermediates and final products which may be prepared:

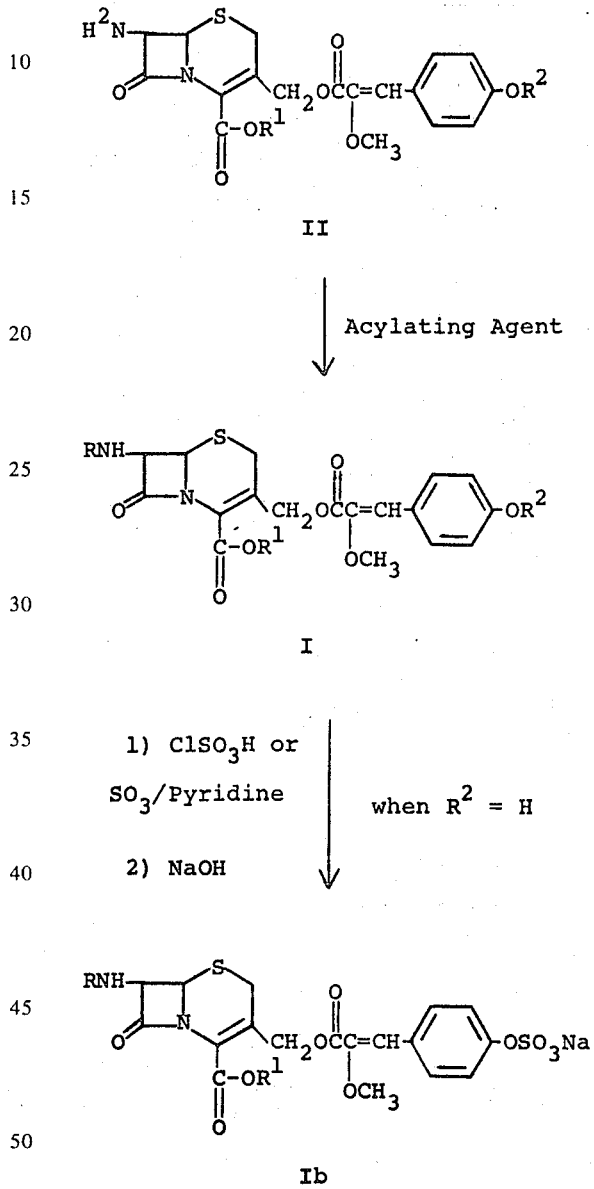

TABLE I

| Example No. | R | $R^1$ | $R^2$ |
|---|---|---|---|
| 3 | ![phenyl-CH(NH2)-C(O)-] PhCH(NH$_2$)C(O)- | -C(CH$_3$)$_3$ | (CH$_3$)$_3$C- |
| 4 | 2-thienyl-CH$_2$-C(O)- | -C(CH$_3$)$_3$ | CH$_3$OCH$_2$- |

TABLE I
(continued)

| Example No. | R | R¹ | R² |
|---|---|---|---|
| 5 | furan-2-yl-CH₂C(=O)- | -CH($\phi$)₂ | CH₃OCH₂- |
| 6 | HO-C₆H₄-CH(NH₂)-C(=O)- | -CH($\phi$)₂ | CH₃OCH₂- |
| 7 | thiazol-2-yl-CH₂C(=O)- | -CH₂C(Cl)₃ | Cl₃CCH₂- |
| 8 | 5-phenyl-1H-tetrazol-yl-CH-C(=O)- | -CH₂-C₆H₄-OCH₃ | CH₃O-C₆H₄-CH₂- |
| 9 | thien-3-yl-CH₂C(=O)- | -CH($\phi$)₂ | ($\phi$)₂CH- |
| 10 | $\phi$-CH(COOH)-C(=O)- | -CH($\phi$)₂ | CH₃OCH₂- |
| 11 | thien-2-yl-CH(COOH)-C(=O)- | -C(CH₃)₃ | CH₃OCH₂- |
| 12 | $\phi$-CH(OH)-C(=O)- | -CH₂C(=O)-$\phi$ | $\phi$-C(=O)CH₂- |
| 13 | 3-Br-C₆H₄-CH₂C(=O)- | -C(CH₃)₃ | (CH₃)₃C- |
| 14 | NH₂CH₂-C₆H₄-CH₂C(=O)- | -CH($\phi$)₂ | ($\phi$)₂CH- |
| 15 | HOOC-CH₂-C₆H₄-CH₂C(=O)- | -CH($\phi$)₂ | ($\phi$)₂CH- |
| 16 | HOC(=O)-NH-CH₂-C₆H₄-CH₂C(=O)- | -CH₂-C₆H₄-OCH₃ | CH₃O-C₆H₄-CH₂- |

TABLE I
(continued)

| Example No. | R | R¹ | R² |
|---|---|---|---|
| 17 | NO₂-[furan]-CH₂C(=O)- | -CH₂C(Cl)₃ | Cl₃CCH₂- |
| 18 | [furan]-CH₂C(=O)- | -CH₂C(=O)-φ | φ-C(=O)CH₂- |
| 19 | Cl-[thiophene]-CH₂C(=O)- | -C(CH₃)₃ | (CH₃)₃C- |
| 20 | CH₃O-[thiophene]-CH₂C(=O)- | -CH(φ)₂ | CH₃OCH₂- |
| 21 | [thiophene]-CH(NH-C(=NH)NH₂)C(=O)- | -CH(φ)₂ | (φ)₂CH- |
| 22 | CH₃-[thiophene]-CH₂C(=O)- | -CH₂-[C₆H₄]-OCH₃ | CH₃O-[C₆H₄]-CH₂- |
| 23 | -C(=O)CH₂-[isothiazole] | -CH₂C(Cl)₃ | [C₆H₅]-CH₂ |
| 24 | CH₃O-[isothiazole]-CH₂C(=O)- | -CH₂C(Cl)₃ | (φ)₃C- |
| 25 | [isothiazole]-CH₂C(=O)- | -C(CH₃)₃ | CH₃OCH₂- |
| 26 | [3-methylisothiazole]-CH₂C(=O)- | -CH(φ)₂ | (CH₃)₃Si- |
| 27 | [3-chloroisothiazole]-CH₂C(=O)- | -CH₂-[C₆H₄]-OCH₃ | O₂N-[C₆H₄]-CH₂- |
| 28 | CH₃-[oxadiazole]-CH₂C(=O)- | -CH₂C(=O)-φ | CH₃OCH₂- |

TABLE I
(continued)

| Example No. | R | R¹ | R² |
|---|---|---|---|
| 29 | thiadiazole-CH₂C(O)- | -CH₂C(O)-φ | $CH_3OCH_2-$ |
| 30 | 4-CH₃-thiadiazole-CH₂C(O)- | -CH₂C(O)-φ | $CH_3OCH_2-$ |
| 31 | 4-Cl-thiadiazole-CH₂C(O)- | -CH(φ)₂ | $CH_3OCH_2-$ |
| 32 | 4-CH₃O-thiadiazole-CH₂C(O)- | -CH(φ)₂ | $CH_3OCH_2-$ |
| 33 | C₆H₅-SCH₂C(O)- | -C(CH₃)₃ | $CH_3OCH_2-$ |
| 34 | pyridyl-SCH₂C(O)- | -C(CH₃)₃ | $CH_3OCH_2-$ |
| 35 | CNCH₂C(O)- | -CH(φ)₂ | $CH_3OCH_2-$ |
| 36 | tetrazolyl-CH₂C(O)- | -CH(φ)₂ | $CH_3OCH_2-$ |
| 37 | C₆H₅-CH(OH)C(O)- | -CH(φ)₂ | $CH_3OCH_2-$ |
| 38 | 2-thienyl-CH(NH₂)C(O)- | -CH₂C(O)-φ | $CH_3OCH_2-$ |
| 39 | 2-thienyl-CH(NH₂)C(O)- | -CH₂-C₆H₄-OCH₃ | $CH_3OCH_2-$ |
| 40 | 2-thienyl-C(O)CH₂C(O)- | -C(CH₃)₃ | $CH_3OCH_2-$ |
| 41 | C₆H₅-CH(PO(OH)₂)C(O)- | -CH₂CCl₃ | $CH_3OCH_2-$ |

TABLE I (continued)

| Example No. | R | R¹ | R² |
|---|---|---|---|
| 42 | phenyl-CH(NHSO₃H)-C(=O)- | $-CH(\phi)_2$ | $CH_3OCH_2-$ |
| 43 | phenyl-CH(OH)-C(=O)- | $-CH(\phi)_2$ | $CH_3OCH_2-$ |
| 44 | phenyl-CH(SO₂(OH))-C(=O)- | $-CH(\phi)_2$ | $CH_3OCH_2-$ |
| 45 | 2-thienyl-CH₂-C(=O)- | $-CH_2OCH_3$ | $CH_3OCH_2-$ |

We claim:

1. A compound of the formula

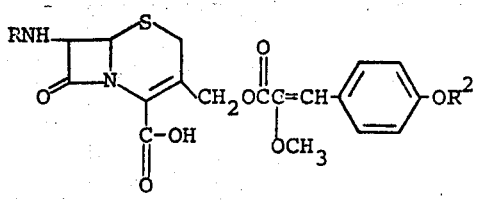

wherein R is an acyl radical and $R^2$ is hydrogen, sulfo, phosphono, acetyl, pivaloyl, pivaloyloxymethyl or lower alkyl and the non-toxic, pharmaceutically acceptable salts and esters thereof.

2. A compound of the formula:

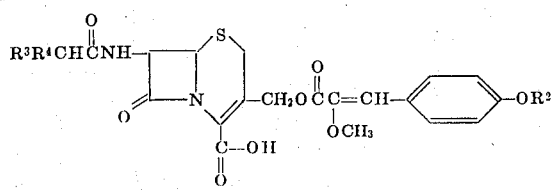

wherein $R^2$ is hydrogen, sulfo, phosphono, acetyl, pivaloyl, pivaloyloxymethyl or lower alkyl; $R^3$ is hydrogen, halo, amino, guanidino, phosphono, hydroxy, tetrazolyl, carboxy, sulfo or sulfamino and $R^4$ is γ-amino-γ-carboxy lower alkyl, phenylthio, cyano, phenyl or substituted phenyl, heterocycle or substituted heterocycle, heterocyclic thio or substituted heterocyclic thio group wherein said heterocycle is selected from the group consisting of furyl, thienyl, thiazolyl, isothiazolyl, oxadiazolyl and thiadiazolyl, and wherein said substituent on the phenyl and heterocycle and heterocyclic thio groups is selected from the group consisting of halo, carboxymethyl, guanidino, guanidinomethyl, carboxamidomethyl, aminomethyl, nitro, methoxy and methyl; or the non-toxic, pharmaceutically acceptable salts and esters thereof.

3. A compound according to claim 2 wherein $R^3$ is hydrogen, amino or carboxy; $R^4$ is 3-amino-3-carboxypropyl, phenyl or a heterocyclic ring selected from the group consisting of furyl, thienyl, thiazolyl, isothiazolyl, oxadiazolyl, and thiazolyl and $R^2$ is hydrogen or sulfo.

4. A compound according to claim 3 wherein the radical

is D-5-amino-5-carboxyvaleryl, 2-furylacetyl, 2-thienylacetyl, 3-thienylacetyl, 5-thiazolylacetyl, D-phenylglycyl, phenylmalonyl, 2-thienylmalonyl or α-tetrazolylphenylacetyl.

5. A compound according to claim 4 named 3-[(α-methoxy-4-hydroxycinnamoyl)oxymethyl]-7-β-(2-thienylacetamido)ceph-3-em-4-carboxylic acid.

6. A compound according to claim 4 named sodium 3-[(α-methoxy-4-sulfoxycinnamoyl)oxymethyl]-7-β-(2-thienylacetamido)ceph-3-em-4-carboxylate.

7. A compound according to claim 4 named sodium 7-β-(D-5-amino-5-carboxyvaleramido)-3-[(α-methoxy-4-hydroxycinnamoyl)oxymethyl]ceph-3-em-4-carboxylate.

8. A compound according to claim 4 named disodium 7-β-(D-5-amino-5-carboxyvaleramido)-3-[(α-methoxy-4-sulfoxycinnamoyl)oxymethyl]ceph-3-em-4-carboxylate.

9. A compound of the formula:

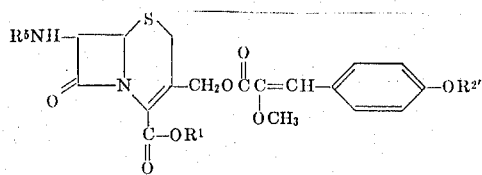

wherein $R^1$ is a protecting group; $R^2$ is hydrogen or a protecting group and $R^5$ is hydrogen or an amino protecting radical.

10. A compound according to claim 9 wherein $R^1$ is a protecting group selected from trichloroethyl, tert-butyl, benzoylmethyl, p-methoxybenzyl, benzyl, benzhydryl, trityl, trimethylsilyl or methoxymethyl; $R^2$ is hydrogen, trichloroethyl, tert-butyl, benzoylmethyl, p-methoxybenzyl, benzyl, benzhydryl, trityl, trimethylsilyl, methoxymethyl or tert-butyloxycarbonyl and $R^5$ is tertiary butoxycarbonyl, trichloroethoxycarbonyl or triphenylmethyl.

* * * * *